United States Patent [19]

Agari

[11] Patent Number: 4,634,295
[45] Date of Patent: Jan. 6, 1987

[54] TRACK SURFACE OF A ROLLER BEARING FOR AN INFINITE RECTILINEAR MOTION

[75] Inventor: Norimasa Agari, Seki, Japan

[73] Assignee: Nippon Thompson Co. Ltd., Tokyo, Japan

[21] Appl. No.: 772,944

[22] Filed: Sep. 5, 1985

[30] Foreign Application Priority Data

Feb. 14, 1985 [JP] Japan .............................. 60-19487[U]

[51] Int. Cl.$^4$ ............................................ F16C 29/06
[52] U.S. Cl. .......................................... 384/44; 384/45
[58] Field of Search ............... 308/3 R, 3 A, 6 R, 6 C

[56] References Cited

U.S. PATENT DOCUMENTS

| 3,410,614 | 11/1968 | Shaw, Jr. | 308/6 C |
| 3,467,447 | 9/1969 | Newman | 308/6 C |
| 3,797,897 | 3/1974 | Schaeffler | 308/6 C |
| 4,497,522 | 2/1985 | Szenger | 308/6 C |

FOREIGN PATENT DOCUMENTS

| 1961468 | 6/1971 | Fed. Rep. of Germany | 308/6 C |
| 2620864 | 11/1977 | Fed. Rep. of Germany | 308/6 C |
| 50176 | 11/1981 | Japan | |
| 471481 | 8/1975 | U.S.S.R. | 308/6 C |

Primary Examiner—Stuart S. Levy
Assistant Examiner—Thomas R. Hannon
Attorney, Agent, or Firm—Trexler, Bushnell & Wolters, Ltd.

[57] ABSTRACT

There is a track surface of a roller bearing for an infinite rectilinear motion in which many rollers roll in keeping with the adjacent relation with one another in an infinite circulating passage constituted such that both ends of a rectilinear load track and a return passage are coupled by direction turning passages, wherein slope ranges each consisting of a gentle slope range formed subsequently to a rectilinear load track surface and a steep slope range steeper than the gentle slope range and formed subsequently thereto are formed in both end portions of the load track surface and are continued to the direction turning passages on both ends of the load track, and concave portions which become narrow toward the longitudinal central portion of the load track surface are formed in the load track surface from both end portions thereof toward the slope ranges. The track surface may be formed as a U-shaped groove and the rolling axes of the adjacent rollers are parallel. Or, the track surface may be formed as a right-angled V-shaped groove and the adjacent rollers are cross rollers, and the length of the concave portion is preferably two or more times larger than the roller diameter. With this arrangements, the elastic deformation, running deformation, and slide resistance can be reduced.

4 Claims, 11 Drawing Figures

FIG. 11

TRACK SURFACE OF A ROLLER BEARING FOR AN INFINITE RECTILINEAR MOTION

BACKGROUND OF THE INVENTION

1. Field of the Invention

The present invention relates to a roller bearing which can infinitely perform a rectilinear motion.

2. Description of the Prior Art

There are roller bearings for an infinite rectilinear motion in which a number of rollers roll in the infinite circulating passage which is constituted such that both ends of the rectilinear load track and return passage are coupled by the direction turning passages. In such bearings, it is known that the number of rollers existing on the load track surface varies between n and n+1 in association with the rolling of the rollers. Therefore, the load supporting force per unit supporting area to the load track surface and, accordingly, the elastic deformation amounts of the track surface and rollers change due to a load change. Thus, during the running, mechanical parts supported and fixed to the bearing are slightly lifted up when the load condition changes from the state in that the number of rollers is small, namely, the elastic deformation amounts are large to the state in that the number of rollers is large, that is, the elastic deformation amounts are smaller. On the contrary, the mechanical parts slightly fall when the load condition varies from the state whereby the number of rollers is large to the state whereby it is small.

The above-mentioned vertical motion (hereinafter, referred to as a running deformation) of the running mechanical parts is very rare. However, for example, in the case where the foregoing bearing is used in a machine tool and the parts of the machine are run and moved, a working accuracy of the machine tool is changed even due to an extremely slight running deformation, so that it is a remarkable obstacle.

To solve the above problem, as shown in the Official Gazette of Japanese Patent Examined Publication No. 2206/1981 (U.S. Pat. No. 3,797,897), there has been known a roller bearing in which wedge-shaped notch portions are formed at the center of both ends in the moving direction of the rolling members on the load track surface. Such a bearing has an effect of reduction of the running deformation amount and also has a function to correct the rollers inclined from the location that is perpendicular to the progressing direction at both ends of the load track surface and thereby to eliminate the gradient. However, this roller bearing has a drawback such that the rollers which roll and come from the no-load range to the load range serving as the load track surface suddenly collide with the remaining portion of the load track surface other than the foregoing notch portion in the edge portion in the moving direction of the rolling members on the load track surface, so that the running deformation amount is enlarged due to this collision.

On one hand, as a technology such that the balls gradually come into contact with the load track surface and the elastic deformation amount is gradually increased and thereby allowing the balls to be smoothly moved, there has been known a technology such that a gentle slope range and a steep slope range are continuously formed in the load track surface (Japanese Utility Model Examined Publication No. 50176/1981). According to this technology, a remarkable effect can be derived by use of the balls which can roll in any directions. On one hand, in case of the roller bearing in which the gentle slope range and steep slope range are formed as mentioned above, an effect of a certain degree can be obtained as compared with the roller bearing in which such slope ranges are not formed. However, the rollers which freely roll in the infinite circulating passage without a holding apparatus enter the load range from the no-load range while complicatedly moving in the actual condition. Consequently, such a technology is practically insufficient to reduce the running deformation.

Although both of those well-known technologies have the slight effects for the running deformation as mentioned above, in the case where the parts of a particularly precise machine tool are moved and run, the running deformation amount reaches a few $\mu$m to tens of $\mu$m. Therefore, this value is unsatisfactory as a running deformation amount of the roller bearing for an infinite rectilinear motion for use in a high precise machine tool.

SUMMARY OF THE INVENTION

It is an object of the present invention to reduce the abovementioned running deformation amount and to improve an accuracy of a machine tool or other machines in which a roller bearing for an infinite rectilinear motion is attached, and thereby to reduce the running slide resistance.

This object is accomplished by a track surface of a roller bearing for an infinite rectilinear motion in which a number of rollers roll in keeping with the adjacent relation with one another in an infinite circulating passage which is constituted such that both ends of a rectilinear load track and a return passage are coupled by direction turning passages. In this invention, slope ranges each consisting of a gentle slope range which is formed subsequently to a rectilinear load track surface and a steep slope range which is steeper than the gentle slope range and is formed subsequently thereto are formed in both end portions of the load track surface and are continued to the direction turning passages on both ends of the load track, and concave portions which become narrow toward the longitudinal central portion of the load track surface are formed in the load track surface from both end portions thereof to the slope ranges.

According to one aspect of the invention, the track surface of the roller bearing is formed such that the cross section perpendicular to the rolling direction of the rollers becomes U-shaped groove, and the rolling axes of the adjacent rollers are parallel.

On one hand, according to another aspect of the invention, the track surface of the roller bearing is formed such that the cross section perpendicular to the rolling direction of the rollers becomes the right-angled V-shaped groove, and the adjacent rollers are cross rollers. In particular, it is desirable to set the length of the concave portion in the rolling direction of the rollers to become two or more times larger than the diameter of the rollers.

By adopting the foregoing arrangements, the elastic deformation amounts of the load track surface and rollers are reduced. In particular, in the case where the roller bearing according to the invention is applied to a machine tool or the like, the running deformation of mechanical parts in the moving portion of such a machine tool can be remarkably made small. Thus, the slide resistance can be also reduced.

The above and other objects, features and advantages of the present invention will be more apparent from the following detailed description in conjunction with the accompanying drawings.

DESCRIPTION OF THE PREFERRED EMBODIMENTS

Embodiments of the present invention will now be described in detail hereinbelow with reference to the drawings.

Figure 10:
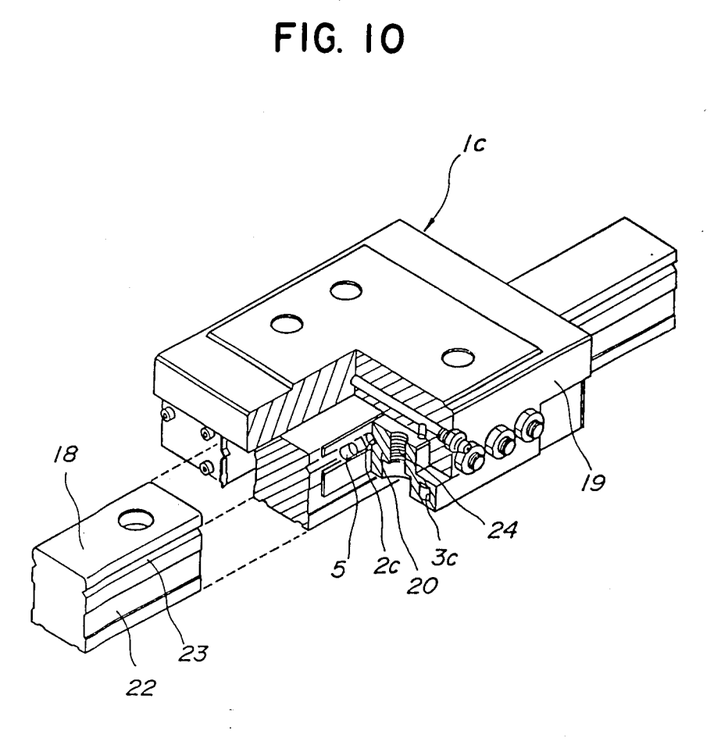
FIG. 10 is a perspective view showing a roller bearing for an infinite rectilinear motion in the third and fourth embodiment.

Although several kinds of roller bearings for an infinite rectilinear motion can be mentioned, the invention is applied to roller bearings for an infinite rectilinear motion in which rolling members are cylindrical and each roller is not attached through a holding apparatus at regular intervals but the respective rollers roll in the infinite circulating passage in keeping with the adjacent relation with one another without the holding apparatus. As the roller bearings for an infinite rectilinear motion of this type, roller bearings as shown in FIGS. 4 and 5 and in FIG. 10 are provided.

Figure 4:
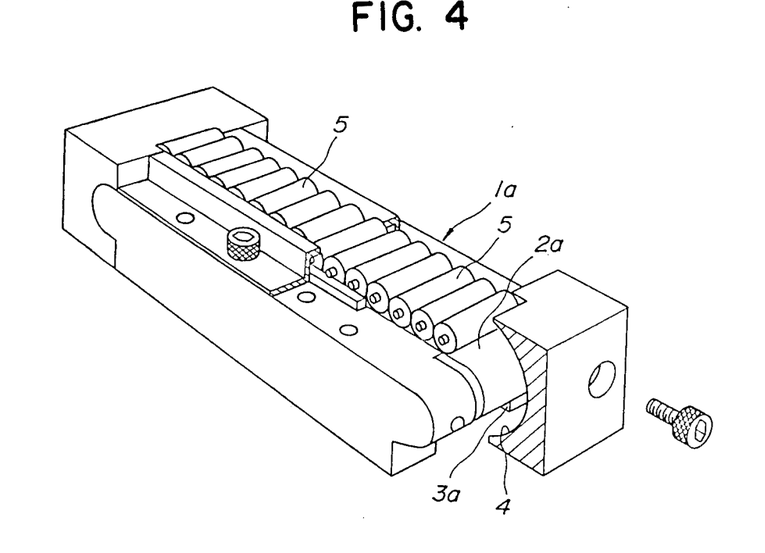
FIG. 4 is a perspective view of a roller bearing for an infinite rectilinear motion in the first and second embodiments.
Figure 5:
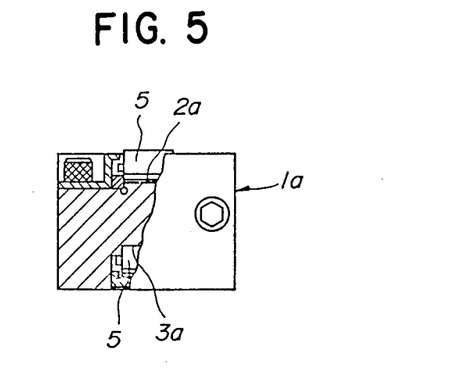
FIG. 5 is a front view of the roller bearing of FIG. 4 including a cross sectional view perpendicular to the rolling direction of the roller.

A roller bearing 1a for an infinite rectilinear motion shown in FIGS. 4 and 5 is constituted in the following manner. Both ends of a rectilinear load track 2a and a return passage 3a are coupled by direction turning passages 4 and thereby forming an infinite circulating passage. A number of identical rollers 5 roll in this infinite circulating passage in keeping with the adjacent relation with one another in a manner such that their rolling axes are parallel with each other. The respective track surfaces of the load track 2a, direction turning passages 4 and return passage 3a in the infinite circulating passage are formed so as to have the U-shaped groove (in this invention, the U-shaped groove also includes the right-angled concave groove).

Figure 1:
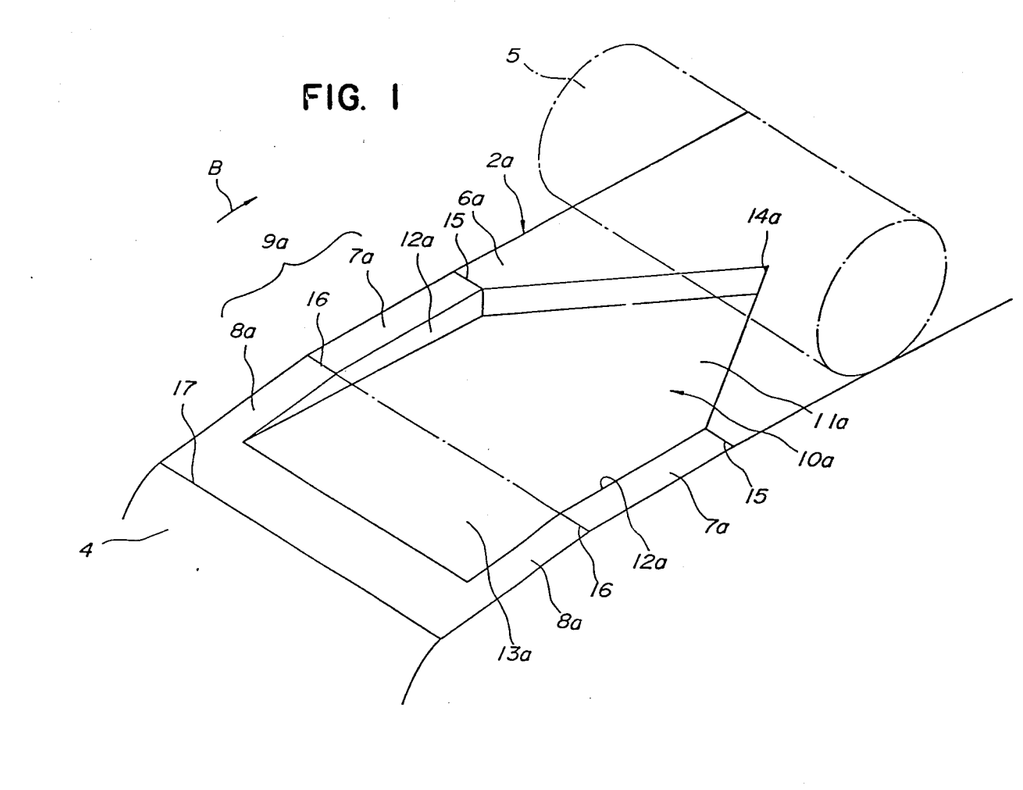
FIG. 1 is a partial perspective view showing the first embodiment of the invention.

The first embodiment shown in FIG. 1 is applied to the load track 2a of the roller bearing 1a of the type shown in FIGS. 4 and 5.

Practically speaking, in FIG. 1, a slope range 9a consists of a gentle slope range 7a which is continuously formed in a rectilinear load track surface 6a and a steep slope range 8a which is steeper than the slope range 7a and is formed subsequently to the slope range 7a. Two slope ranges 9a are formed in both end portions of the load track surface 6a and are continuous to the direction turning passages 4 on both ends of the load track surface 6a. Concave portions 10a which become narrow toward the longitudinal central portion of the load track surface 6a, namely, in the direction opposite to the direction turning passages 4 are formed in the load track 2a in the regions from both end portions of the load track surface 6a to the slope range 9a.

In this embodiment, the concave portion 10a is constituted in a manner such that a V-shaped tapering concave portion 11a which is symmetrical with respect to the central axis of the load track surface 6a is formed in the track surface 6a, and parallel side edge portions 13a having parallel side edges 12a are formed in the slope range 9a subsequently to the tapering concave portion 11a.

Figure 3:
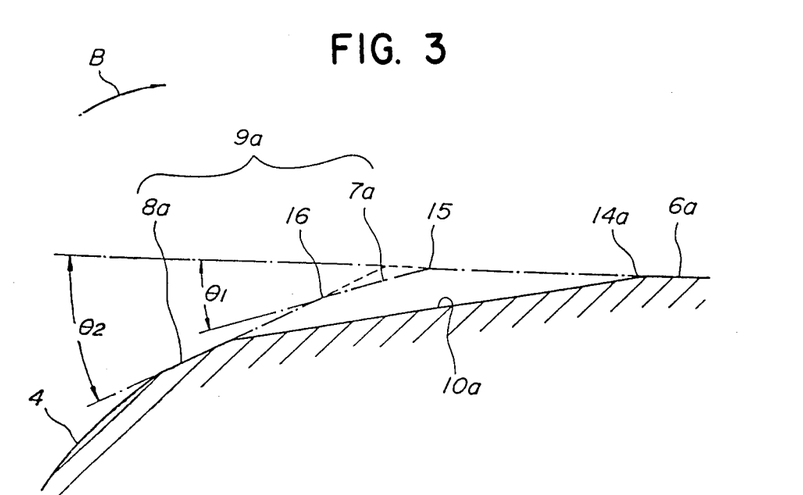
FIG. 3 is a partial vertical cross sectional view showing a slope range and a concave portion.

As shown in FIG. 3, there is a relation of $\theta_2 > \theta_1$ between an angle $\theta_1$ of inclination of the gentle slope range 7a and an angle $\theta_2$ of inclination of the steep slope range 8a. On the other hand, as the concave portion 10a, it is possible to consider two concave portions: one is the portion such that a pointed portion 14a of the tapering concave portion 11a is formed as a concave portion in the load track surface 6a as shown in FIG. 1; and the other is the portion such that the pointed portion 14a is located on the load track surface 6a as shown in FIG. 3.

It is desirable that a boundary line 15 between the load track surface 6a and the gentle slope range 7a, a boundary line 16 between the gentle slope range 7a and the steep slope range 8a and a boundary line 17 between the steep slope range 8a and the direction turning passage 4 are constituted by gently-sloping curves in consideration of a point such that the shock during the rolling between the roller 5 and the portion near the edge portion of the load track 2a can be more lightened.

In the foregoing arrangement, as the rollers 5 roll from the direction turning passage 4 along the steep slope range 8a and gentle slope range 7a in the direction indicated by an arrow B in FIGS. 1 and 3, the load which is applied to each roller 5 is gradually increased. In addition, as the rollers 5 move from the steep slope range 8a to the gentle slope range 7a, the increase ratio of the running deformation is reduced. As the rollers 5 roll on the load track 2a until the pointed portion 14a of the tapering concave portion 11a of the concave portion 10a, the running deformation is gradually decreased. After the rollers 5 passed through the pointed portion 14a, a variation in running deformation disappears.

Namely, by forming the slope range 9a consisting of the steep and gentle slope ranges 8a and 7a and the concave portion 10a, it is possible to prevent a rapid variation in running deformation between the rollers 5 and the load track 2a when the rollers 5 move from the direction turning passage 4 as the no-load range to the load track 2a.

On the other hand, since the concave portion 10a also serves as an oil pocket of the infinite circulating passage, the lubricating effect between the rollers 5 and the load track surface 6a is particularly increased.

Figure 2:
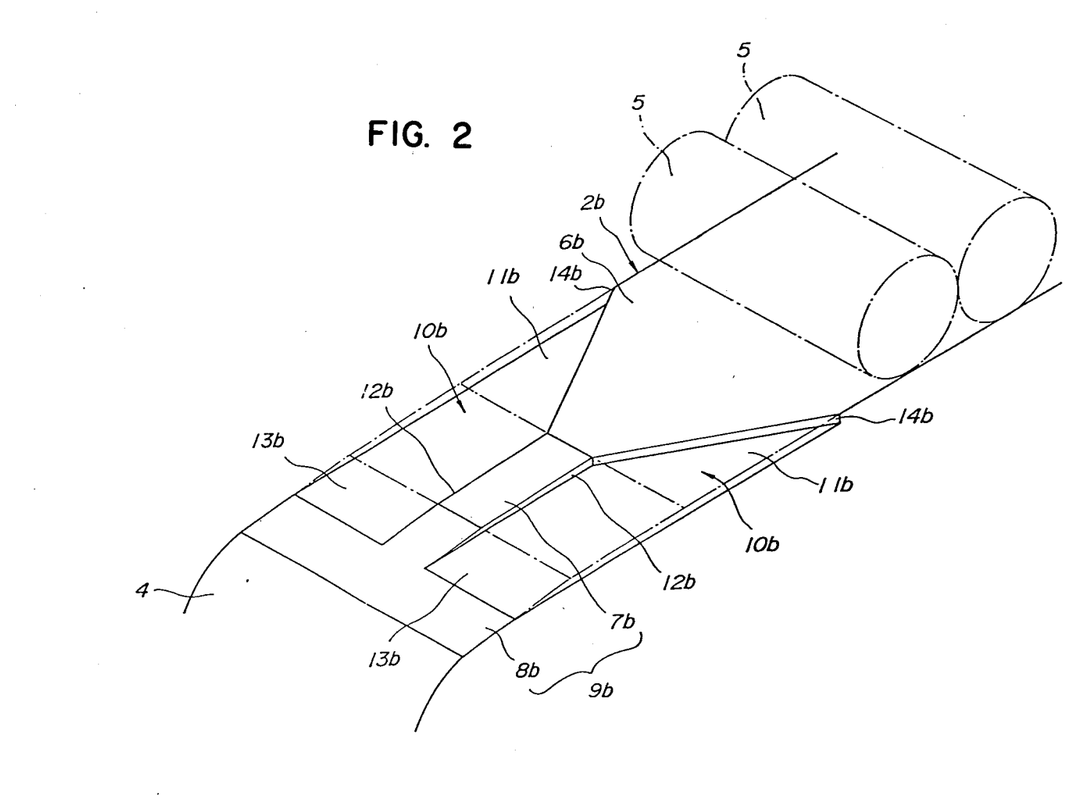
FIG. 2 is a partial perspective view showing the second embodiment of the invention.

The second embodiment shown in FIG. 2 is also applied to the load track 2a of the roller bearing 1a of the type shown in FIGS. 4 and 5.

This second embodiment is substantially similar to the first embodiment with regard to the arrangement such that two slope ranges 9b each consisting of a gentle slope range 7b which is formed subsequently to the load track surface 6b and a steep slope range 8b which is formed subsequently to the gentle slope range 7b are formed in both end portions of a rectilinear load track surface 6b and are continuous to the direction turning passages 4 on both end portions of the load track surface 6b. However, in the second embodiment, two concave portions 10b are formed symmetrically with respect to the central, narrow and gentle slope range 7b in the load track surface 6b from each end portion thereof to the slope range 9b. The former portions of the concave portions 10b are formed in parallel on the right and left sides of the gentle slope range 7b so as to have the same width, while the latter portions are formed such that their widths gradually become narrow from those parallel concave portions to both side edges of the load track surface 6a in the direction opposite to each direction turning passage 4.

In other words, two tapering concave portions 11b each having a right-angled triangle are formed on both sides of the load track surface 6b. Subsequently to the tapering concave portions 11b, two parallel side edge portions 13b having parallel side edges 12b are formed in the load track surface 6b, while allowing the narrow gentle slope range 7b and the narrow steep slope range 8b having the same width as the range 7b to remain. Therefore, pointed portions 14b of the tapering concave portions 11b are located at both side ends of the load track surface 6b, respectively, and the steep slope range 8b remains like a T-shape.

According to the second embodiment as well, it is possible to prevent the rapid variation in running deformation similarly to the first embodiment.

In the first and second embodiments, each length of the tapering concave portions 11a and 11b in the rolling direction of the rollers 5 is longer than the diameter of each roller. Therefore, this makes it possible to further reduce the slide resistance upon running of the roller bearing 1a based on the running deformation.

A roller bearing 1c for an infinite rectilinear motion shown in FIG. 10 is constituted in the following manner. Namely, both ends of a rectilinear load track 2c and a return passage 3c are coupled by direction turning passages (not shown) and an infinite circulating passage is formed. This infinite circulating passage is provided in a casing 19 which runs on a rectilinear track rail 18. This roller bearing 1c adopts cross rollers of the type such that many rollers 5 alternately cross the rolling axes of the adjacent rollers 5 in the right angle and the rollers 5 roll in the infinite circulating passage in keeping with the adjacent relation with one another. The relative vertical positions or the like of the load track 2c and return passage 3c, which are parallel with each other, in the casing 19 may be set to various kinds of locations. In the example shown in FIGS. 6 and 10, the load track 2c is formed as a right-angled V-shaped groove in an inside vertical surface 21 of a bearing plate 20 which is attached in the casing 19. The return passage 3c is formed as a groove having a substantially square cross section at the position lower than the load track 2c. The load track 2c faces a rail load track 23 which is formed as a right-angled V-shaped groove in a vertical side surface 22 of the track rail 18. The rollers 5 serving as the cross rollers roll between the load tracks 2c and 23 in the load region.

Figure 6:
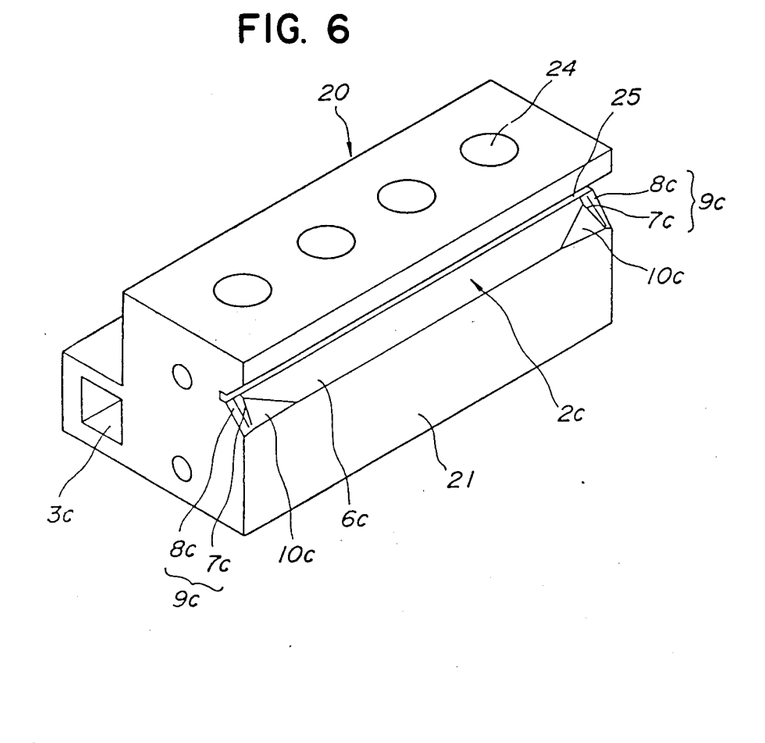
FIG. 6 is a perspective view showing a bearing plate in the third embodiment of the invention.
Figure 7:
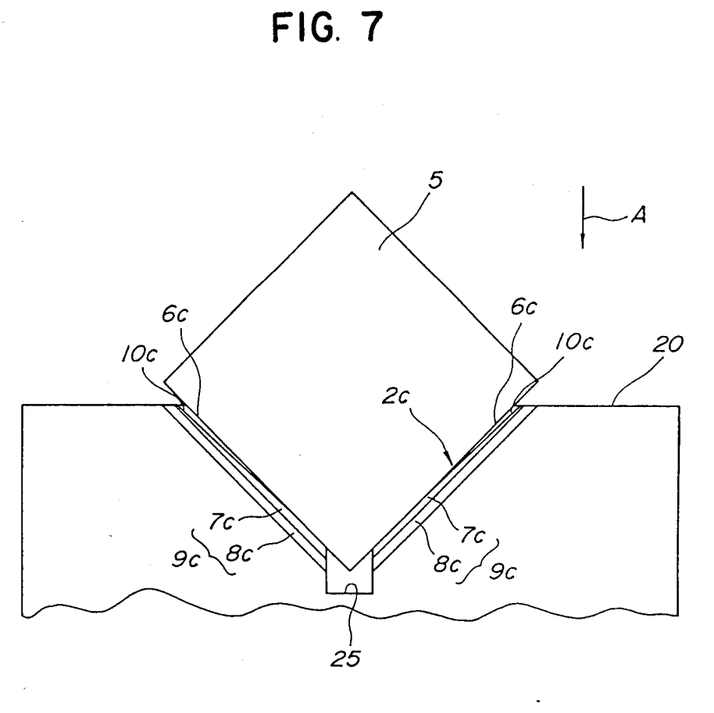
FIG. 7 is a side elevational view showing only the grinding working portion in FIG. 6.
Figure 8:
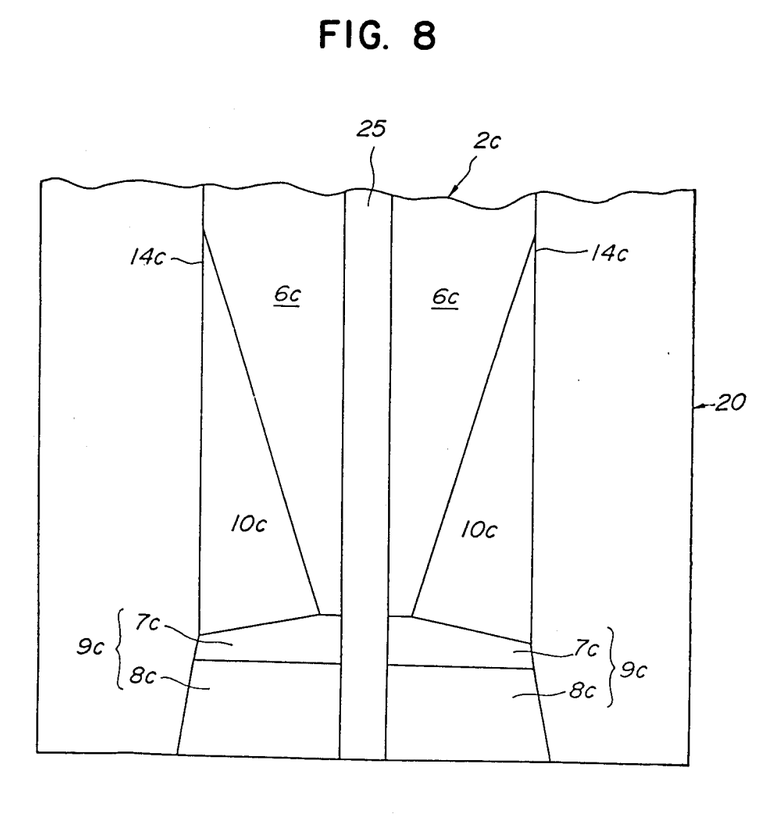
FIG. 8 is a projection diagram in the direction indicated by an arrow A in FIG. 7.

The third embodiment shown in FIGS. 6 to 8 is applied to the foregoing load track 2c.

Namely, a slope range 9c consists of a gentle slope range 7c which is formed subsequently to a load track surface 6c and a steep slope range 8c which is steeper than the gentle slope range 7c and is formed subsequently thereto. The rectilinear load track 2c as the right-angled V-shaped groove is formed by the two load track surfaces 6c which cross each other at a right angle. The above-mentioned slope ranges 9c are formed on both end portions of the load track surfaces 6c and are continued to direction turning passages (not shown) on both ends of this roller bearing. Further, concave portions 10c are formed in the load track surfaces 6c from both end portions thereof to the slope ranges 9c. Each concave portion 10c gradually becomes narrow in the longitudinal central direction of the load track surface 6c, namely, in the direction opposite to the direction turning passage.

In the third embodiment, the load track 2c is the right-angled V-shaped groove and the rollers 5 serve as the cross rollers. Thus, each of the slope ranges 9c, gentle slope ranges 7c, and steep slope ranges 8c constitutes the right-angled V-shaped groove as shown in FIGS. 7 and 8.

The concave portions 10c are formed at the locations near both outside edge portions of the load track 2c in a manner such that they gradually become narrow from the load track surfaces 6c toward the gentle slope ranges 7c in the longitudinal central direction of the load track surfaces 6c, and that pointed portions 14c of the concave portions 10c are located on the load track surfaces 6c.

In the third embodiment with an arrangement having the slope ranges 9c and concave portions 10c as well, it is possible to prevent a rapid variation in running deformation between the rollers 5 and the load track 2c while the rollers 5 roll from the direction turning passage serving as the no-load range to the load track 2c similarly to the foregoing embodiments.

The slope range 9c and concave portion 10c may be formed in only the load track surface 6c on a single side in dependence on the positional relation between the load track 2c and the return passage 3c and on the position of the direction turning passage to couple both of them.

Figure 9:
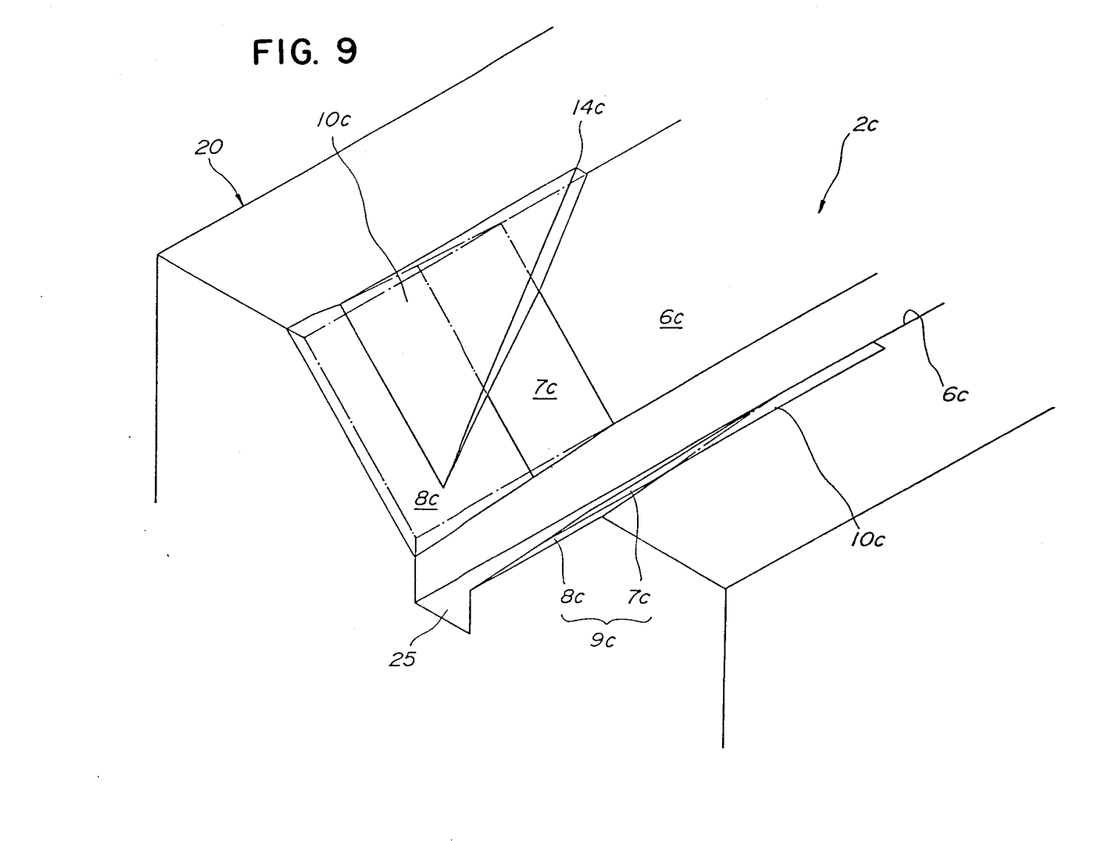
FIG. 9 is a partial perspective view showing the fourth embodiment of the invention.

The fourth embodiment shown in FIG. 9 is substantially similar to the foregoing third embodiment with respect to that the slope ranges 9c consisting of the gentle slope ranges 7c and steep slope ranges 8c are formed on both end portions of the load track 2c. However, in the fourth embodiment, the concave portion 10c is formed in the load track surface 6c, gentle slope range 7c and steep slope range 8c. In addition, the pointed portions 14c of the concave portions 10c are formed as recess portions in the load track surface 6c.

In case of the foregoing third and fourth embodiments, the rollers 5 serve as cross rollers; therefore, even if the length of the concave portion 10c in the rolling direction of the rollers 5 is slightly larger than the roller diameter, it is insufficient. In other words, by setting such a length to be two or more times larger than the roller diameter, it is possible to effectively prevent a rapid variation in running deformation with regard to the two adjacent rollers 5 whose rolling axis directions differ by 90°.

In FIG. 6, the bearing plate 20 is attached to the casing 19 by means of bolts in attaching holes 24. On one hand, a grinding clearance groove 25 is formed between the load track surfaces 6c of the load track 2c and is used to grind and work the load track surfaces 6c, gentle slope ranges 7c and steep slope ranges 8c.

Figure 11:
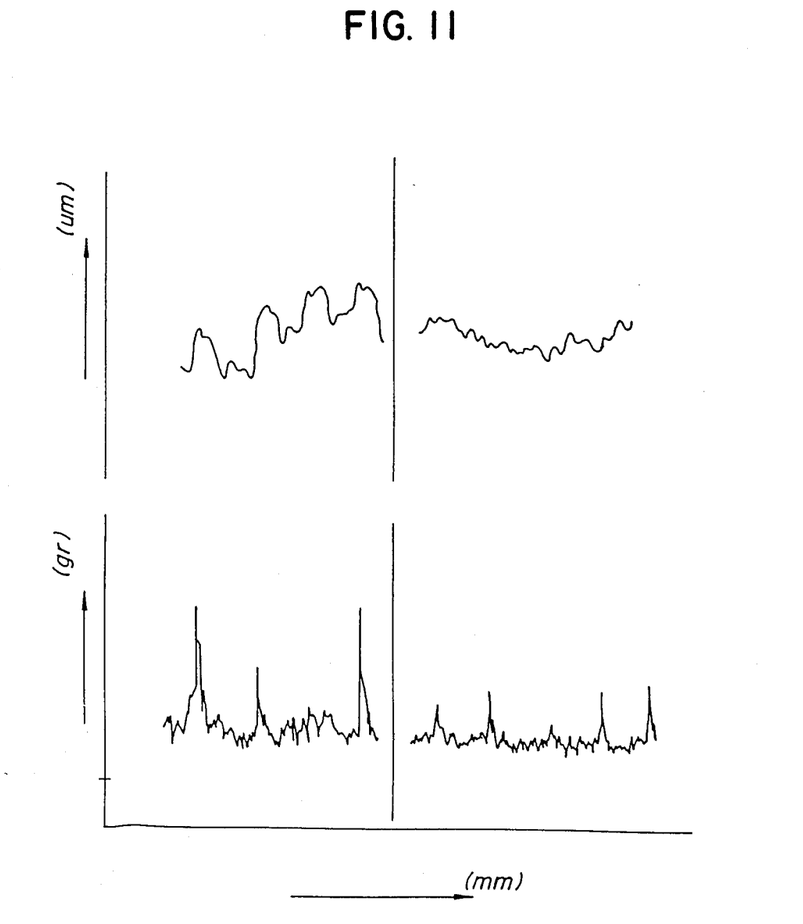
FIG. 11 is a comparison measurement diagram showing the relations among the movement distance and the running deformation and the slide resistance in the roller bearing shown in FIG. 10.

FIG. 11 is a graph of the measurement result showing the relations among the running deformation, the slide resistance and the movement distance of the roller bearing in the cases where the slope ranges 9c are not formed in the roller bearing 1c shown in FIG. 10 according to a conventional bearing and where the slope ranges 9c are formed in the roller bearing 1c according to the present invention. It will be obviously understood from this graph that the slide resistance is reduced due to the formation of the slope ranges. Although a large swell appears in the curves showing the running deformation in FIG. 11, this swell is mainly caused due to the undulation of the rail load track 23 of the track rail 18. In the curves showing the slide resistance, a rapid increase in slide resistance is caused due to the phenomenon called a stick slip of the rollers 5 which roll on the load track 2c.

The present invention has the following effects.

The sudden collision of the rollers which roll from the no-load range to the load track surface is prevented. The sudden change of the number of rollers which exist on the load track surface is eliminated. The running deformation amount and slide resistance are reduced. The mechanical parts to which the roller bearing of the invention was attached can be run and driven by way of a lesser energy with the aid of the reduction of the slide resistance. In the case where this roller bearing is attached to a machine tool or the like, the positioning accuracy of the machine is improved and the skew of the rolling rollers can be corrected and eliminated.

Although the present invention has been shown and described with respect to preferred embodiments, various changes and modifications which are obvious to a person skilled in the art to which the invention pertains are deemed to lie within the spirit and scope of the invention.

What is claimed is:

1. A track surface of a roller bearing for an infinite rectilinear motion in which a number of rollers respectively having rolling axes roll in succession in an infinite circulating passage which is constituted such that both ends of a rectilinear load track having a central longitudinal portion and a return passage are coupled by direction turning passages, wherein slope ranges each consisting of a gentle slope range which is formed subsequently to a rectilinear load track surface and a steep slope range which is steeper than said gentle slope range and is formed subsequently thereto are formed in both end portions of said load track surface and are continued to said direction turning passages on both ends of said load track, and concave portions which become narrow toward the longitudinal central portion of said load track are formed in the load track from both end portions thereof to said slope ranges.

2. A track surface according to claim 1, wherein said track surface of the roller bearing is formed such that a cross section parallel to the axes of the rollers comprises a U-shaped groove, and the rolling axes of the adjacent rollers are parallel.

3. A track surface according to claim 1, wherein said track surface of the roller bearing is formed such that a cross section parallel to the axes of the rollers becomes a right-angled V-shaped groove, and the adjacent rollers are cross rollers.

4. A track surface according to claim 3, wherein the length of said concave portion in the rolling direction of the rollers is two or more times larger than the diameter of the rollers.

* * * * *